US005312606A

United States Patent [19]

Boffito et al.

[11] Patent Number: 5,312,606

[45] Date of Patent: May 17, 1994

[54] PROCESS FOR THE SORPTION OF RESIDUAL GAS BY MEANS OF A NON-EVAPORATED BARIUM GETTER ALLOY

[75] Inventors: Claudio Boffito; Antonio Schiabel, both of Milan, Italy

[73] Assignee: SAES Getters SpA, Milan, Italy

[21] Appl. No.: 89,620

[22] Filed: Jul. 12, 1993

Related U.S. Application Data

[63] Continuation of Ser. No. 854,568, Mar. 20, 1992, abandoned.

[30] Foreign Application Priority Data

Apr. 16, 1991 [IT] Italy ........................ MI91 A 001038

[51] Int. Cl.[5] ........................................... B01J 8/06

[52] U.S. Cl. ................................ 423/210; 252/181.4; 252/181.7; 313/481; 313/561; 423/219; 423/235; 423/239.1; 423/247

[58] Field of Search ..................... 423/239.1, 219, 210, 423/247, 235; 252/181.4, 181.7; 313/481, 561

[56] References Cited

U.S. PATENT DOCUMENTS 859,021 7/1907 Soddy ............................ 252/181.7
4,203,049 5/1980 Kuus ............................... 252/181.6
4,665,343 5/1987 Ferrario et al. ................. 252/181.1

FOREIGN PATENT DOCUMENTS 62-057640 8/1987 Japan .

OTHER PUBLICATIONS

Joseph Babor, Basic College Chemistry 2nd Ed, 1953, p. 256.

*Primary Examiner*—Michael Lewis
*Assistant Examiner*—Wendy Lovern
*Attorney, Agent, or Firm*—David R. Murphy

[57] ABSTRACT

The process of the present invention provides for the sorption of unwanted gas in a vessel by means of a non-evaporated barium getter. It comprises the steps of reducing an alloy of $Ba_{1-x}A_xLi_{4-y}B_y$ to a particle size of less than 5 mm, under vacuum or an inert gas atmosphere and then placing the reduced alloy in the vessel. Upon exposing the reduced alloy to the residual gas in the vessel at a temperature of less than 150° C., the gas is sorbed. The metal A is a metal chosen from the group consisting of elements of Group IIa of the periodic table of elements, excluding barium. The metal B is chosen from the group consisting of elements of Group IIIa of the periodic table of elements. Preferably $0 \leqq x \leqq 0.5$ and $0 \leqq y \leqq 3.5$.

14 Claims, 11 Drawing Sheets

PROCESS FOR THE SORPTION OF RESIDUAL GAS BY MEANS OF A NON-EVAPORATED BARIUM GETTER ALLOY

This application is a continuation of application Ser. No. 07/854,568, filed Nov. 20, 1992, now abandoned.

FIELD OF THE INVENTION

The present invention relates to a process for a sorbing residual gases by means of a non-evaporated barium getter.

BACKGROUND

Barium getters are well known in the art. In the form of the more of less pure element, barium was placed inside a metal container to protect it from reaction with the atmosphere. Then, when required to be used, it was mounted inside a vacuum device where, after partial evacuation and seal-off of the device, the barium was caused to evaporate. The barium, after evaporation, deposited in the form of a thin film within the vacuum device where it sorbed the residual or unwanted gases throughout the life of the device.

While these getter devices released barium they were also found to release a large amount of undesirable gases that had been picked up during storage or handling. This was due to the getter material being barium in the form of an element which is reactive with gases.

In order to reduce the reactivity of the barium, it was then alloyed with one or more metals. Such alloys were inter alia Ba-Mg, Ba-Sr-Mg, Ba-Mg-Al. See for example the book "Getterstoff und Ihre Anwendung in the Hochvakuumtechnik" by M. Littmann, E Winter'sche Verlagshandlung, Leipzig 1939. One of the most successful was the alloy $BaAl_4$ having a weight percent of barium from 40 to 60 percent. Such an alloy is very inert and, as with all inert barium alloys, it must be evaporated before it can sorb gases. It can be çaused to dissociate and release barium by means of applying heat to the $BaAl_4$ alloy alone but, more recently, it has become widespread to mix the $BaAl_4$ with an approximately equal weight of nickel. These two materials, in powder form, when heated react exothermically to form a solid residue of Ni-Al and evaporated Ba. However, these getter materials have to be heated to about 800° C. before the exothermic reaction starts whereupon they reach 1000° C., and more, when there is the sudden release of heat on reacting exothermically.

In Japanese Patent Publication number SHO 42-4123 the barium-aluminium (about 50% Ba) alloy is mixed with, preferably, 15% by weight of powdered tin to produce getters. Said getters are heated by means of high frequency electrical induction to about 600° C. for one minute during the exhaust process. As a result of the reaction which may be produced by said heating, it is considered that $BaSn_2$ may be produced, or liberated barium is produced, from the barium-aluminium alloy by reaction of aluminium and tin. In either case, a mixed getter material of barium-aluminium alloy and tin which is stable at a normal temperature is activated and absorb gases at a normal temperature. Nevertheless there is a heating process involved which requires temperatures of several hundreds of degrees centigrade. Furthermore an uncontrolled chemical reaction is taking place.

Another family of getter devices has been based upon the elements zirconium or titanium. Powdered Zr 84%−Al 16%, $Zr_2Fe$ nd $Zr_2Ni$ are among these. They are known as non-evaporated getters because they do not require any of their component elements to be evaporated in order to become capable of sorbing gas. However they do require heating to a high temperature to make them gas sorptive. This is because they are covered with surface layers of oxides and nitrides which passivate them and render them inactive. Upon heating, in vacuum, the passivating layers diffuse into the bulk material and the surface becomes clean and active. This heating process usually takes place at a high temperature, say 900° C. for about 10–30 seconds. This temperature can be reduced but requires a longer time. For instance several hours at 500° C.

Even more recently non-evaporated getters based on Zr-V have been used. Such alloys as Zr-V-Fe and Zr-V-Ni have gained widespread acceptance as "low temperature" activatable non-evaporated getters. By low temperature activatable it means that a significant proportion of their gettering activity already becomes available within a relatively short time at moderate temperatures. It is believed that this is due to the ease with which the surface layers of passivating materials may diffuse into the bulk material at these relatively low temperatures. Whatever the reason for their ability to become active at these relatively low temperatures of 400°-500° C. this can still be an undesirably high temperature under many circumstances. All these gas sorptive material have been used in admixture with other materials, both gas sorptive or not, in an attempt to lower their temperature of activation.

There are many occasions in which it is desirable to remove unwanted gases from a vessel which under no circumstances can be allowed to be subject to a high temperature. Such may be the case for instance when the vessel is made of organic plastic or contains components of organic plastic. The organic plastic may melt. Even if the organic plastics do not melt they may reach such a temperature that they start to decompose or at least give off a large amount of gas which may be hydrocarbons or other organic gases. If they are sorbed by the getter material, this causes their premature failure as they only have a finite gettering power or ability to sorb a fixed quantity of gas. The rapid sorption of a large amount of gas impares their ability to later sorb gas during the life of the device in which they are employed. Otherwise there remains too high a gas pressure for the device to work as intended. This temperature may be as low as about 150° C. At these temperatures, and lower, oxygen and water vapour permeation, and especially nitrogen, can be a problem. Lithium organic resins have been proposed for the sorption of gas impurities from impure gas streams, but they are used for the purification of nitrogen gas and not for its sorption, see U.S. Pat. No. A-4,603,148 and U.S. Pat. No. A-4,604,270.

Although it has been suggested that non-evaporated getters can be introduced into the device in a preactivated form, that is when they have already been heated to a high temperature of about 600° C., they have already been subjected to many manufacturing processes such as grinding to fixed particle size, mixing with other materials, compaction or forming into pellets.

BRIEF OBJECTS OF THE INVENTION

It is therefore an object of the present invention to provide a process for the sorption of residual gas in a vessel which is free from one or more of the disadvantages of prior art processes.

It is another object of the present invention to provide a process for the sorption of residual gas in a vessel which does not require the getter materials to be activated at temperatures greater than 150° C.

A further object of the present invention to provide a process for the sorption of unwanted gas in a vessel which does not require temperatures of greater than 150° C.

It is yet another object of the present invention to provide a process for the sorption of residual gas in a vessel which does not require the getter to be mixed with other materials. Another object of the present invention to provide a process for the sorption of residual gas in a vessel which can be used in vessels made of organic plastic.

Yet a further object of the present invention is to provide a process for the sorption of nitrogen gas in a vessel made of organic plastic or which contains organic plastic.

These and other objects and advantages of the present invention will become clear to those skilled in the art by reference to the following description thereof and drawings wherein:

DETAILED DESCRIPTION OF THE INVENTION

Figure 1:
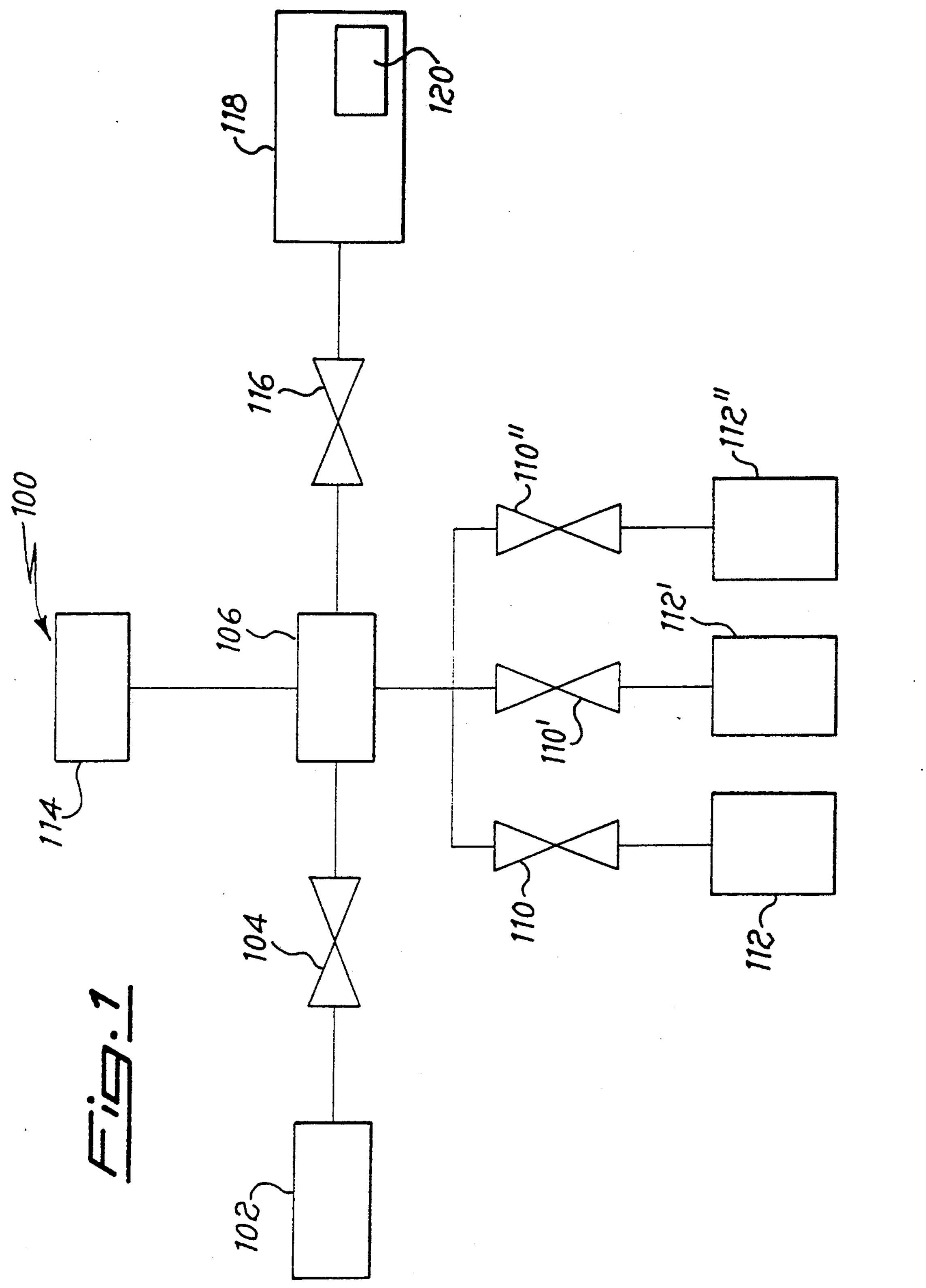
FIG. 1 is a drawing showing in a schematic form an apparatus for measuring the sorption properties of alloys useful in providing a process of the present invention.

The process of the present invention provides for the sorption of residual gas in a vessel by means of a non-evaporated barium getter. It comprises the steps of reducing an alloy of $Ba_{1-x}A_xLi_{4-y}B_y$, preferably to a particle size of less than 5 mm, under vacuum or an inert gas atmosphere and then placing the reduced alloy in the vessel. Upon exposing the reduced alloy to the residual gas in the vessel at a temperature of less than 150° C. the gas is sorbed. The metal A is a metal chosen from the group consisting of elements of Group IIa of the periodic table of elements, excluding barium. The metal B is chosen from the group consisting of elements of Group IIIa of the periodic table of elements and magnesium.

The alloys of the present invention do not have to be activated, that is they are already capable of sorbing gases at room temperature and furthermore they do not have to be evaporated to produce a film of active material, such as barium before they sorb gas. Nevertheless they can be activated by heating to a temperature of not greater than 150° C. This could be between 50° C. and 150° C. for at least 10 minutes and then reducing the temperature to less than 50° C. The alloys can be described by the general formula $Ba_{1-x}A_xLi_{4-y}B_y$, where A is a metal chosen from the group consisting of elements of Group IIa of the periodic table of elements, excluding barium. The numbering of the Group of elements is that adopted by The American Chemical Society. Thus A can be calcium, magnesium and strontium but is preferably calcium as calcium is only slightly less reactive than barium. Magnesium and strontium are less preferred for their lower reactivity. The value of x may be as low as zero such that there is no metal of Group IIa present (except the barium). On the other hand it may be as high as 0.8. Above about 0.5 the alloy begins to lose its ability to react at room temperature with the residual gas at a sufficiently high sorption speed.

The element B is any metal chosen from the group consisting of elements Group IIIa of the periodic table of elements and magnesium. All members of Group IIIa can be adopted, for instance boron, but aluminium is preferred as it is readily available, it has a relatively high melting point and is extremely cheap, while gallium is liquid near ambient temperatures. Indium has a low melting point and is more expensive then aluminium. Tl is highly toxic. Furthermore $0 \leq y \leq 3.5$.

These compounds can be easily comminuted or reduced to a particulate form without any difficulty. For instance they can be reduced to a particle size of less than 5 mm in diameter, and preferably less than 1 mm, by known techniques under a vacuum or inert atmosphere and then transferred to the vessel containing the unwanted gas which is desired to be removed. This is accomplished by placing the reduced alloy in the vessel and exposing the reduced alloy to the residual gas at room temperature.

The reduced alloy can be transferred to the vessel immediately but preferably takes place by means of an intermediate vessel in which the alloy is stored under vacuum or an inert atmosphere until it is required.

Surprisingly they immediately start to sorb large amounts of unwanted gas. Even more surprisingly they sorb nitrogen with a much higher sorption speed and sorb greater quantities than prior art non-evaporated getter devices after no activation, or an activation at not greater than 150° C.

The invention may be better understood by reference to the following examples wherein all parts and percentages are by weight unless otherwise indicated. These examples are designed to teach those skilled in the art how to practice the present invention and represent the best mode presently known for practicing the invention.

EXAMPLE 1

This example is not representative of the present invention but is designed to show an apparatus suitable for measuring the gas sorption properties of alloys suitable for practicing processes of the present invention. FIG. 1 is a drawing showing in a schematic form an apparatus 100 for measuring the sorptive properties of $Ba_{1-x}A_xLi_{4-y}B_y$ alloys useful in the present invention. A vacuum pumping system 102 is connected by means of a first valve 104 to a dosing volume 106. Connected with dosing volume 106 there is a series of second valves 110, 110', 110'' for the inlet of test gases from a series of test gas reservoirs 112, 112', 112'', containing $N_2$, artificial air, and CO respectively, and a pressure measuring gauge 114. To dosing volume 106 is also connected, by third valve 116, a test chamber 118 containing the sample 120 under test.

In operation valves 110, 110', 110'' and 116 are closed and 104 is opened and the vacuum pump system 102 pumped the system down to $10^{-6}$ mbar. For all test the dosing volume 106 was a volume of 0.71 litre. A sample of powered alloy 120, contained within a glass bulb test chamber 118 of approximately 0.1–0.3 litre volume (depending upon the sample), under an inert atmosphere of argon gas was attached to apparatus 100 via valve 116 (closed). Valve 116 was opened and again the system was pumped down to $10^{-6}$ mbar while the sample was held at about 100° C. for 20 minutes which simulates a process to which the getter may be subject. Valves 104 and 116 were then closed and test gas was admitted to dosing volume 106, from gas reservoir 112, (112', 112'') by opening valve 110 (110', 110'') for a short while. The pressure was noted on pressure gauge 114, and was arranged to be such that the pressure was about 0.4–1.0 mbar after opening valve 116 to introduce a dose of test gas to the sample 120.

EXAMPLE 2

This example was designed to show how to manufacture an alloy useful in the process of the present invention.

In an iron crucible were placed 155.88 g of commercial grade barium (purity greater than 98%) obtained from Degussa together with 11.3 g of lithium. The crucible was placed in an induction furnace and heated under an argon atmosphere at 400 mbar pressure with medium frequency induction heating until the mixture was thoroughly melted and homogeneous thus forming a fusion. The fusion was then poured into a cold copper mould and allowed to cool to room temperature while still under the protective atmosphere of argon.

The alloy corresponds to the intermetallic compound $BaLi_4$.

EXAMPLE 3

This example was designed to show the use of an alloy in the process of the present invention.

Figure 2:
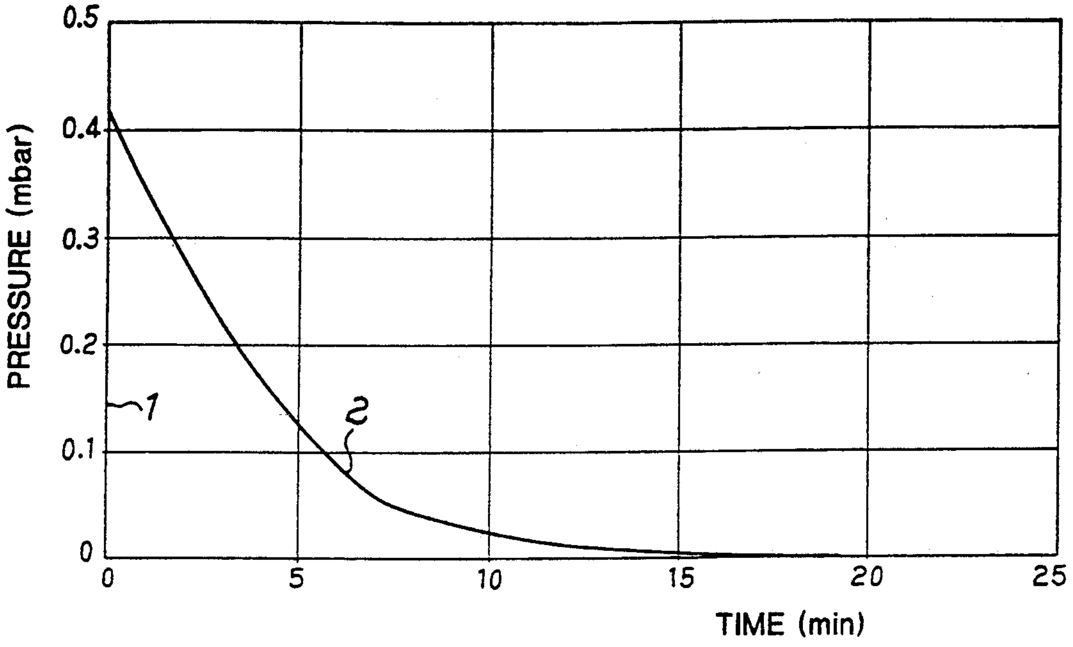
FIG. 2 shows the results of sorption tests of $N_2$ at 25° C. performed on alloy of $BaLi_4$ of the present invention.

A barium-lithium alloy as prepare in Example 2 above was placed in a glove-box under a protective atmosphere of argon at slightly greater than 1 atmosphere pressure. The alloy was ground using a mortar and pestle to a particle size of less than 1 mm and a sample of 2.7 g was sealed in a glass vessel of volume 0.17 litre. The sample in the glass vessel was then attached as test chamber 118 to the test apparatus of Example 1. The procedure of Example 1 was followed and a first dose of gas, in this case nitrogen (from reservoir 112 by means of valve 110), was introduced to the sample. The pressure in the vessel was measured by means of pressure gauge 114 as a function of time. The curve obtained is reported on FIG. 2 as curve 1. The sorption was so rapid that the pressure drop was almost instantaneous. A second dose of nitrogen was introduced and the pressure in the vessel as measured by the pressure gauge 114 was reported as curve 2 on FIG. 2.

Figure 3:
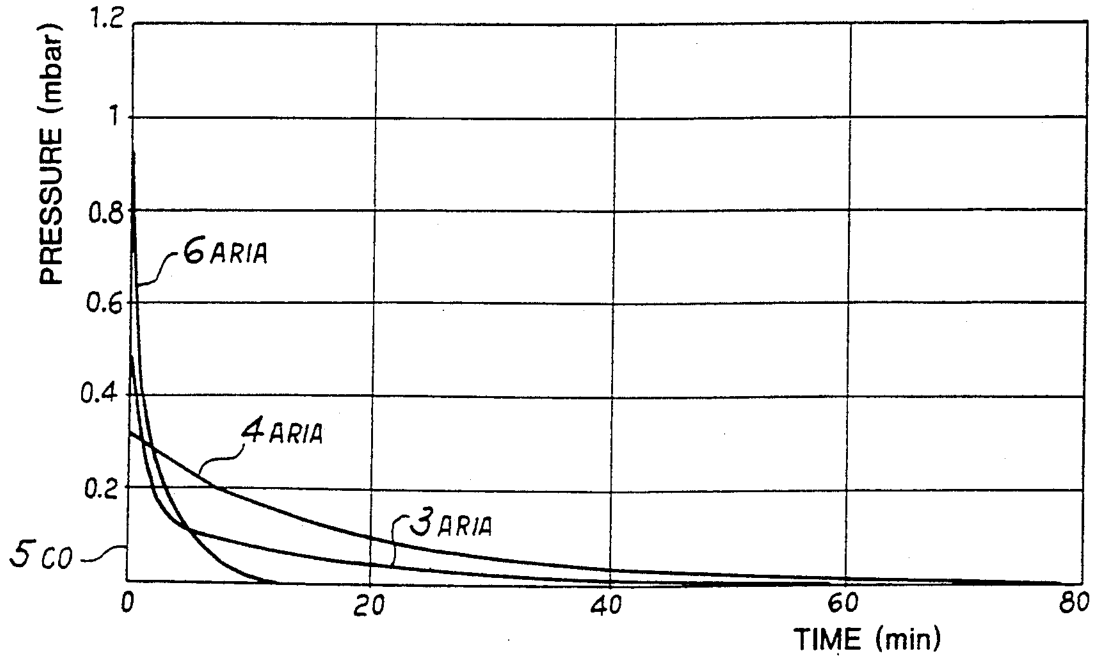
FIG. 3 shows the results of sorption tests of various gases at 25° C. performed on an alloy of $BaLi_4$ of the present invention.
Figure 4:
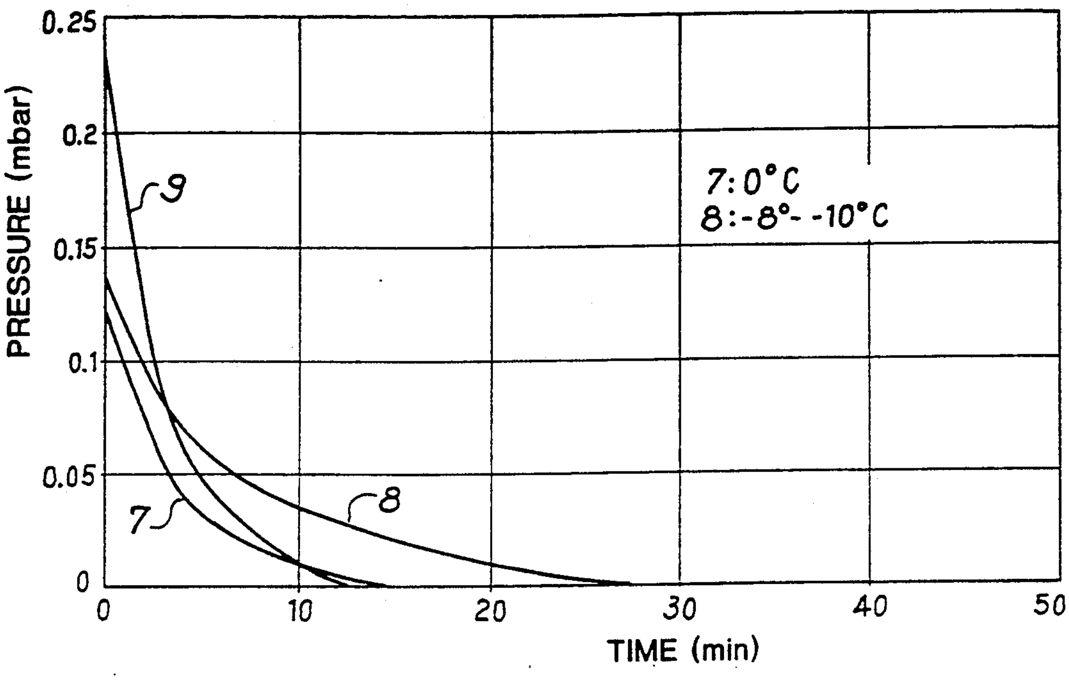
FIG. 4 shows the results of sorption tests of $N_2$, at various temperatures, performed on an alloy of $BaLi_4$ of the present invention.
Figure 5:
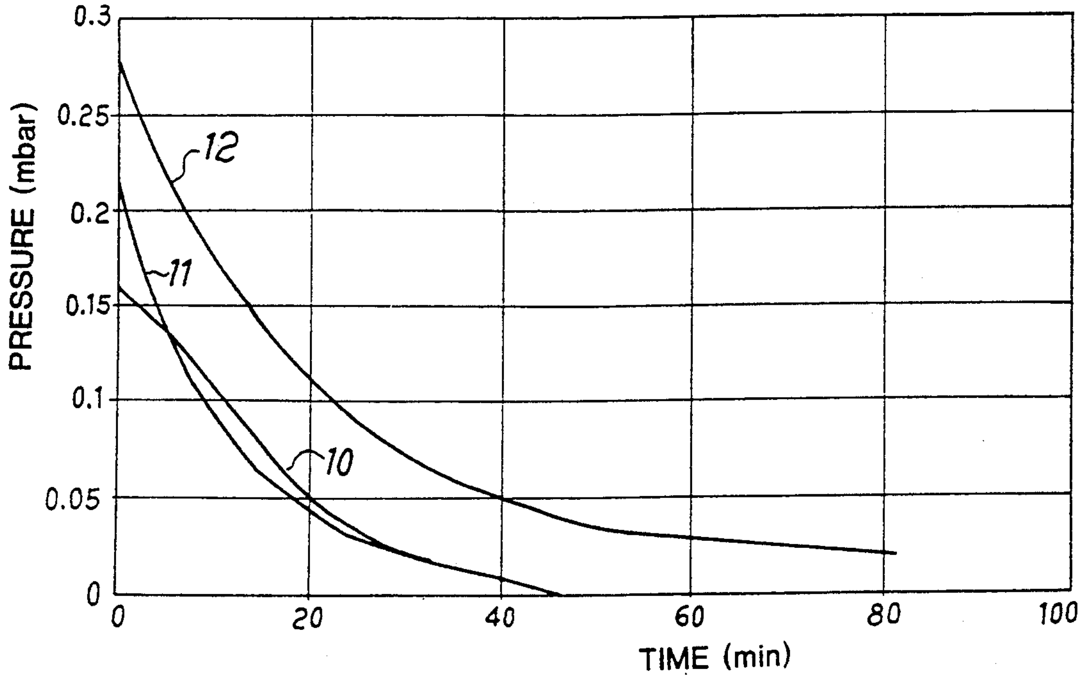
FIG. 5 shows the results of sorption tests of $N_2$ at 25° C. performed on an alloy of $BaLi_4$ of the present invention.

The gas was replaced by artificial air labeled "ARIA" in FIG. 3, that is a mixture of 80% v/v $N_2$+20% v/v $O_2$ (from reservoir 112' by means of valve 110') and the pressure in the vessel was recorded as curve 3 on FIG. 3. This was repeated to give curve 4. The gas was replaced by CO (from reservoir 112'' by means of valve 110'') and the pressure in the vessel was recorded as curve 5 for which the sorption was so rapid that the pressure drop was almost instantaneous. Artificial air was again introduced to give curve 6.

The sample was then cooled to 0° C. and on introducing a sample of $N_2$ gas curve 7 was recorded.

The sample was then cooled to about −8° C. to −9° C. with a bath of alcohol+iced water and on introducing a dose of nitrogen curve 8 was recorded.

Again at 25° C. a dose of nitrogen was introduced and curve 9 was recorded.

A further 3 doses of nitrogen were introduced to the sample and curves 10–12 were recorded.

Figure 6:
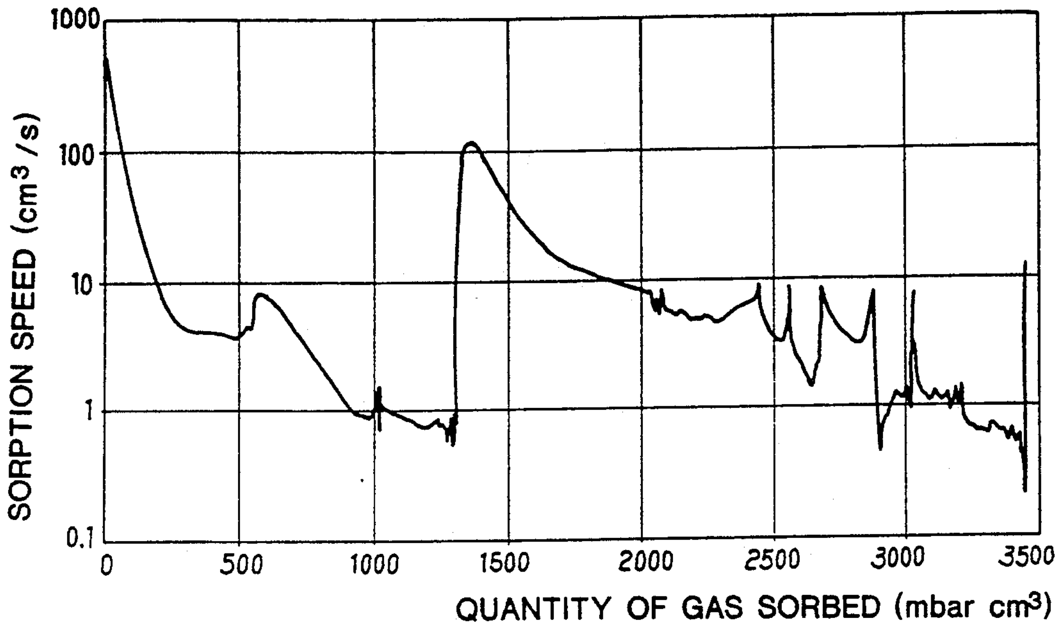
FIG. 6 shows the gas sorption speed derived from the curves of FIGS. 2–5 as a function of the quantity of gas sorbed.

The total doses of gas absorbed by the sample during these tests were, $N_2$=2818 mbar.cm$^3$; $O_2$=421 mbar.cm$^3$; CO=216 mbar.cm$^3$. FIG. 6 shows the gas sorption speed derived from the curves of FIGS. 2–5, by differentiation, as a function of gas sorbed.

EXAMPLE 4

This example was designed to show how to manufacture another alloy, by partial replacement of barium by calcium, useful in the process of the present invention.

114.08 g of barium (type HP made by SAES Getters S.p.A.) was placed in an iron crucible together with 30.75 g of lithium and 1.10 g of granulated calcium (supplied by Carlo Erba, purity greater than 99.5%).

The crucible was placed in an induction furnace and heated under an argon atmosphere of 400 mbar with medium frequency induction heating until the mixture was thoroughly melted and homogeneous thus forming a fusion. The fusion was then poured into a cold iron mould and allowed to cool to room temperature while still under the protective atmosphere of argon. The weight of alloy after fusion was 138 g.

The alloy corresponds to the composition $Ba_{0.75}Ca_{0.25}Li_4$.

EXAMPLE 5

This example was designed to show the use of the alloy produced as in Example 4 in the process of the present invention.

Figure 7:
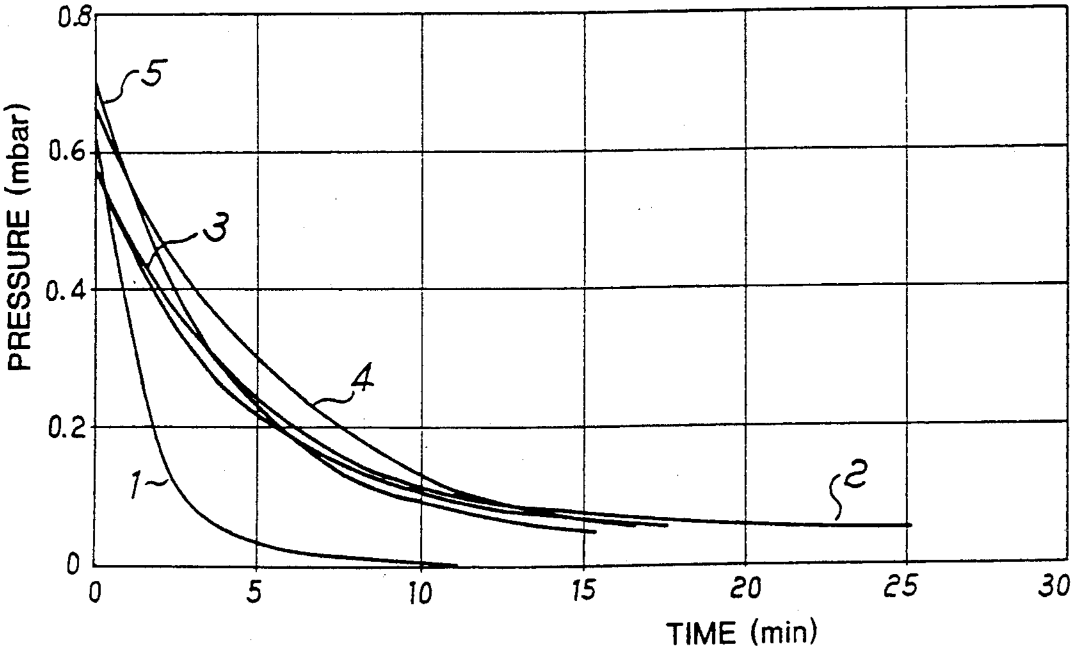
FIGS. 7–9 show the results of sorption tests of $N_2$ at 25° C. performed on an alloy of $Ba_{0.75}Ca_{0.25}Li_4$ of the present invention.
Figure 8:
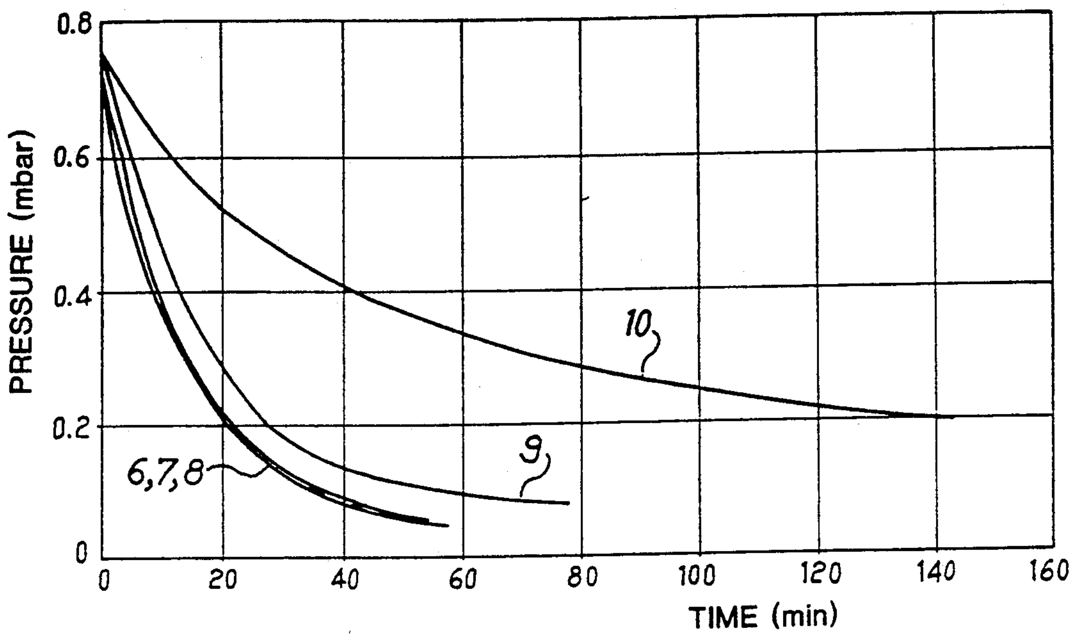
Figure 9:
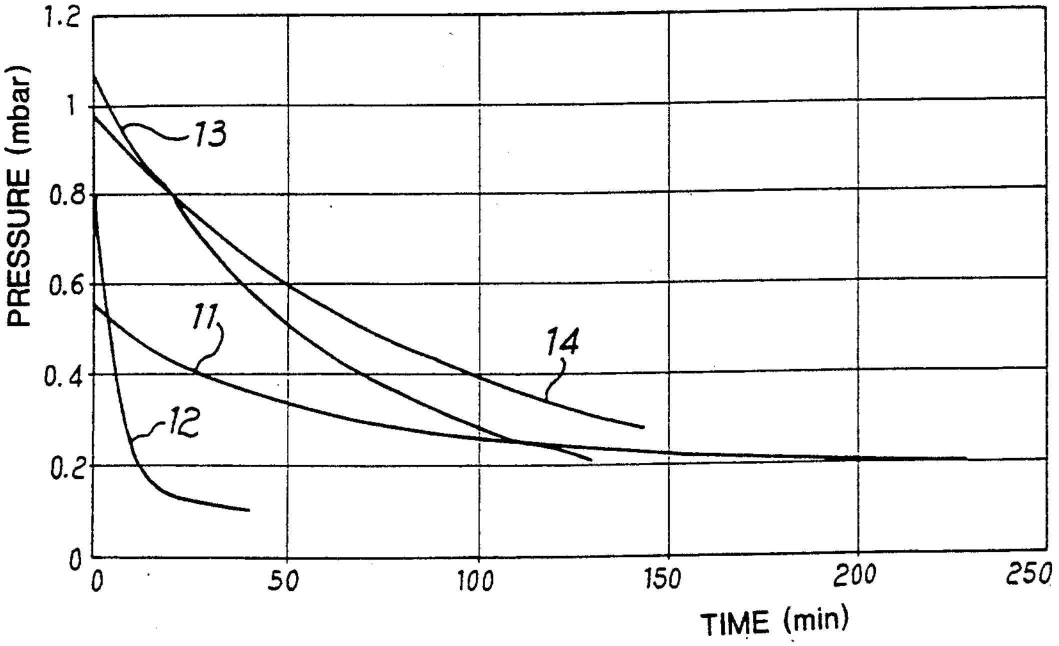
Figure 10:
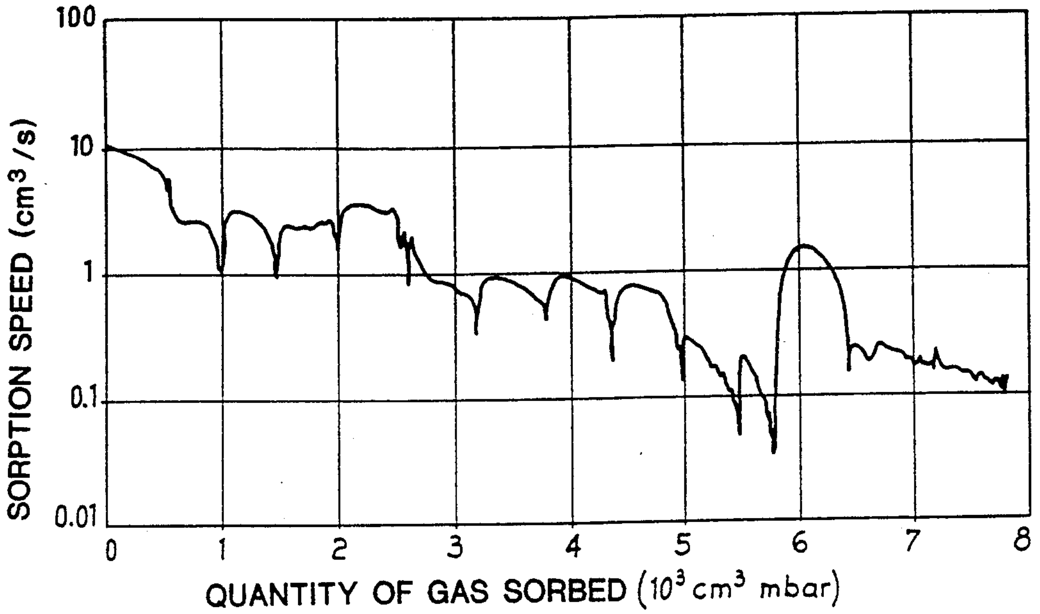
FIG. 10 shows the gas sorption speed derived from the curves of FIGS. 7–9 as a function of the quantity of nitrogen sorbed.
Figure 11:
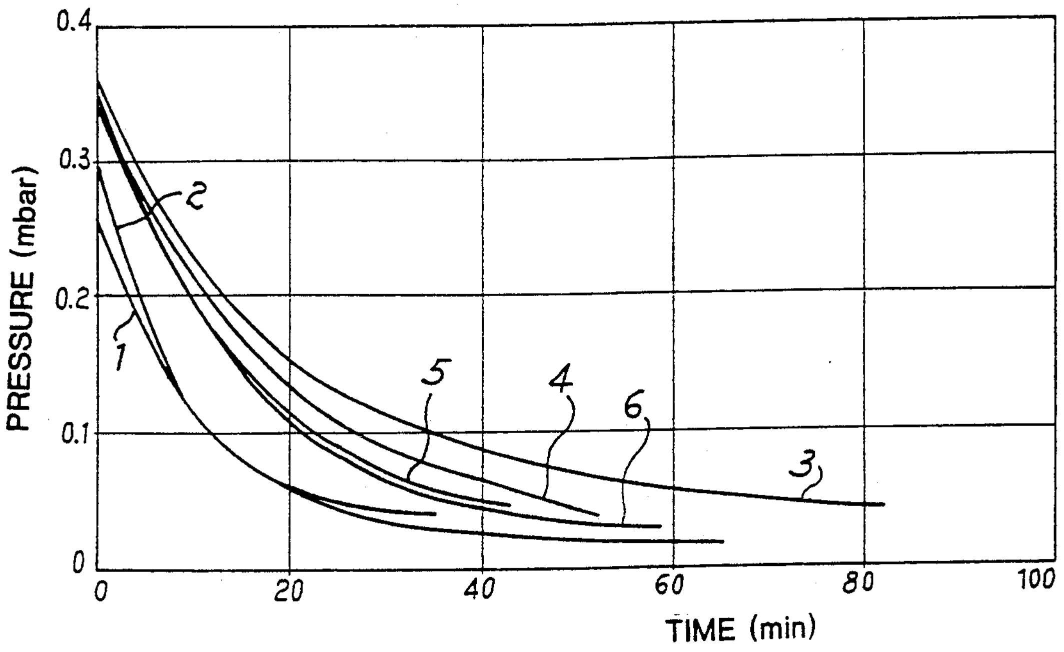
FIGS. 11–15 show the results of sorption tests of $N_2$ at 25° C. performed on an alloy of $Ba_{0.5}Ca_{0.5}Li_4$ of the present invention.
Figure 12:
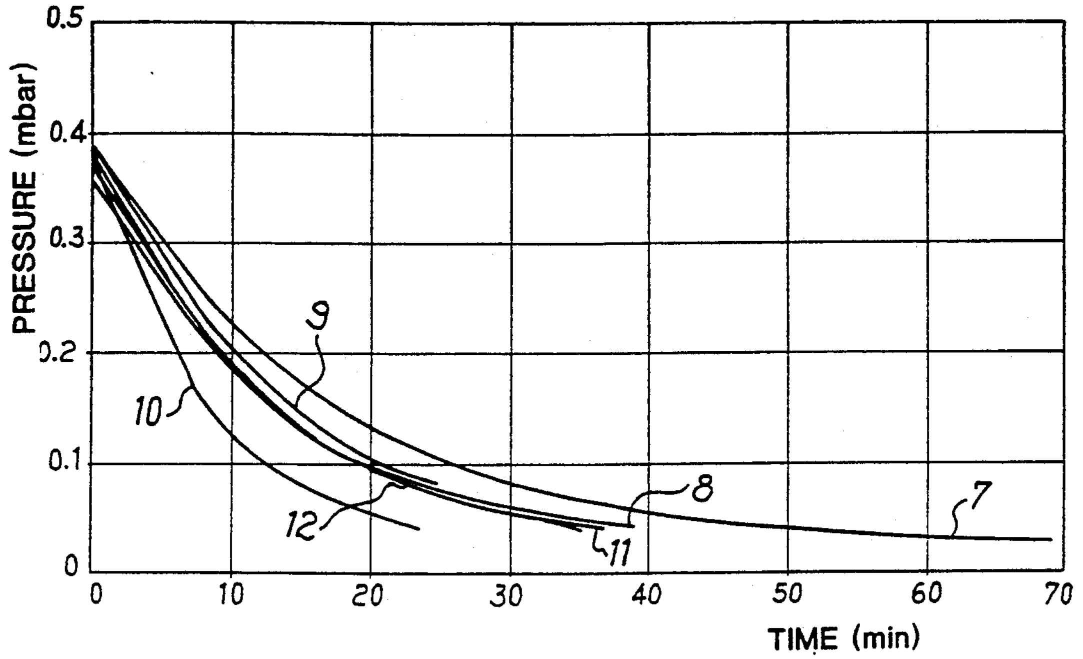
Figure 13:
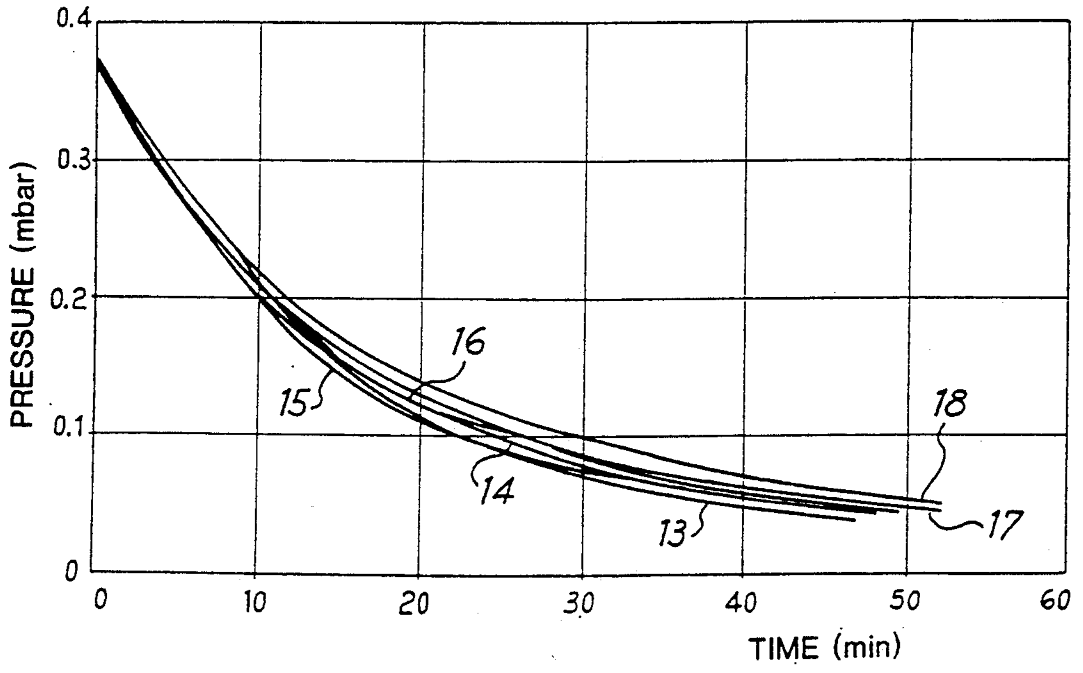
Figure 14:
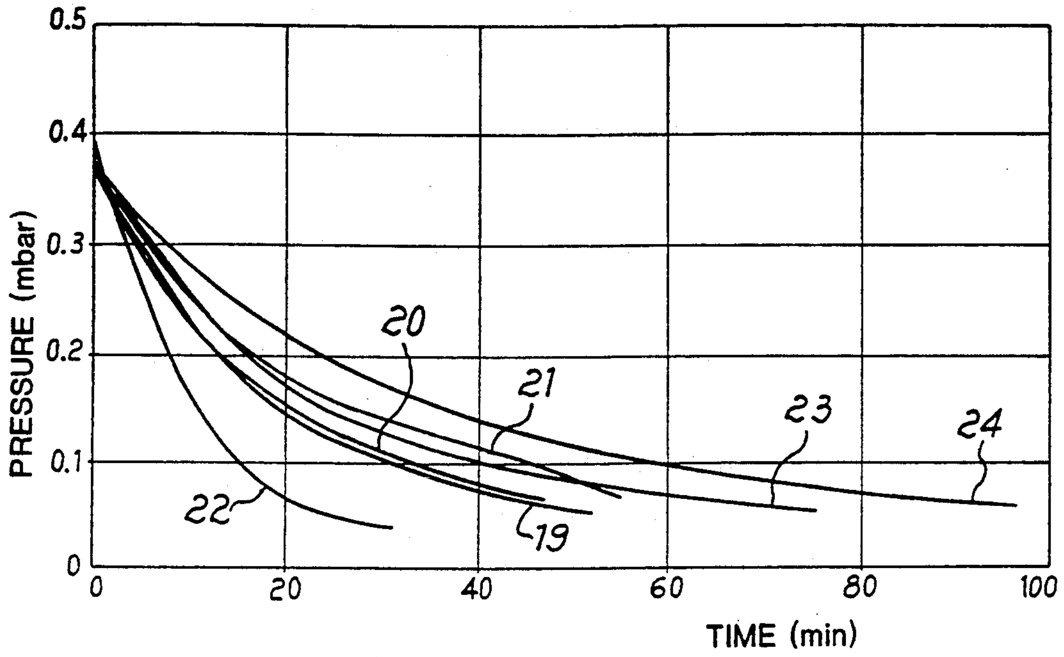
Figure 15:
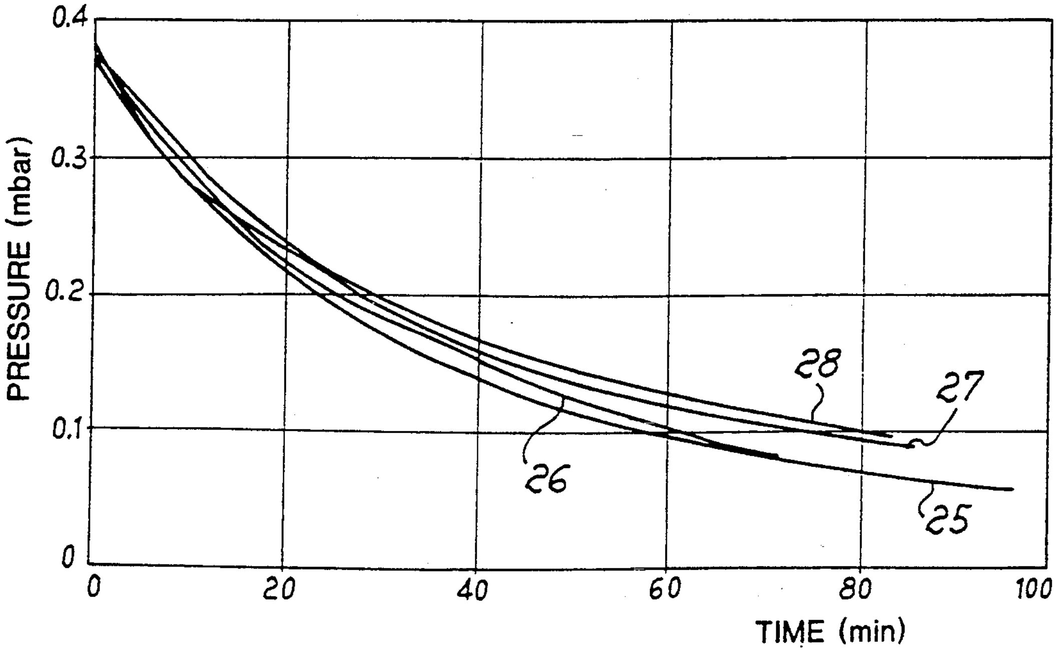

A barium-calcium-lithium alloy as prepared in Example 4 above was placed in a glove box under a protective atmosphere of argon at slightly greater than 1 mm atmosphere pressure. The alloy was ground to a particle size of less than 1 mm with a pestle and a mortar and a sample of 2.0 g was sealed in a glass vessel of volume 0.32 litre. The sorption properties were measured as in Example 3 for $N_2$ at 25° C. and are reported as curves 1-14 in FIGS. 7-9. FIG. 10 shows the nitrogen sorption speed derived from the curves of FIGS. 7-9, by differentiation, as a function of nitrogen sorbed.

EXAMPLE 6

This example was designed to show how to manufacture another alloy, by replacement of more barium by calcium, useful in the process of the present invention.

25.3 g of barium (type HP made by SAES Getters S.p.A.) was placed in an iron crucible together with 7.38 g of granulated calcium (purity greater than 99.5%) obtained from Carlo Erba and 10.23 g of lithium. The crucible was placed in an induction furnace and heated under an argon atmosphere at 400 mbar pressure with medium frequency induction heating until the mixture was thoroughly melted and homogeneous thus forming a fusion. The fusion was then poured into a cold iron mold and allowed to cool to room temperature while still under the protective atmosphere of argon. The weight of alloy after fusion was 39.6 g. The alloy corresponds to a composition $Ba_{0.5}Ca_{0.5}Li_4$.

EXAMPLE 7

Figure 16:
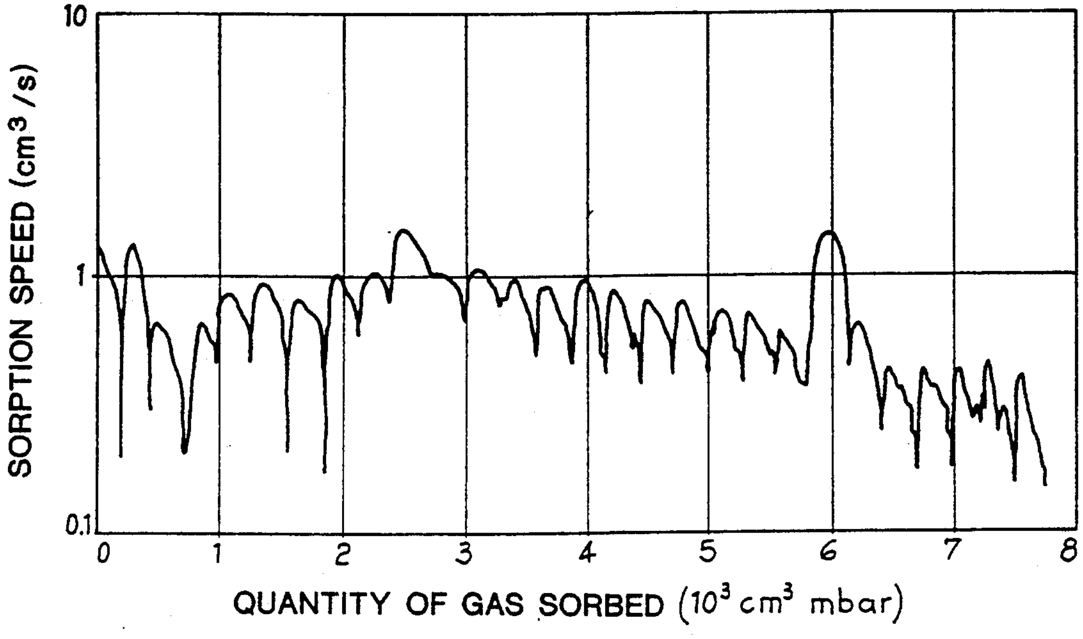
FIG. 16 shows the gas sorption speed derived from the curves of FIGS. 11–15 as a function of the quantity of nitrogen sorbed.

This example was designed to show the use of the alloy produced as in Example 6 in the process of the present invention. A barium-calcium lithium alloy as prepared in Example 6 above was placed in a glove box under a protective atmosphere of argon at slightly greater than 1 atmosphere pressure. The alloy was ground to a particle size of less than 1 mm with a pestle of volume 0.15 a sample of 2.47 g was sealed in a glass vessel of volume 0.15 litre. The sorption properties were measured for nitrogen at 25° C. as in Example 3, and are reported as curves 1-28 in FIGS. 11-15. FIG. 16 shows the gas sorption speed derived from the curves of FIGS. 11-15 as a function of quantity of gas sorbed.

EXAMPLE 8

This example was designed to show how to manufacture yet another alloy useful in the process of the present invention. 59.14 g of barium (type HP made by SAES Getters S.p.A.) was placed in an iron crucible together with 8.97 g of lithium and 11.61 g of SAVA aluminium beads (purity greater than 98.5%). The crucible was placed in an induction furnace and heated under an argon atmosphere of 400 mbar with medium frequency induction heating until the mixture was thoroughly melted and homogeneous thus producing a fusion. The fusion was then poured into a cold iron mold and allowed to cool to room temperature while still under the protective atmosphere of argon. The weight of alloy after fusion was 78.3 g.

The alloy corresponds to the composition $BaLi_3Al$.

EXAMPLE 9

Figure 17:
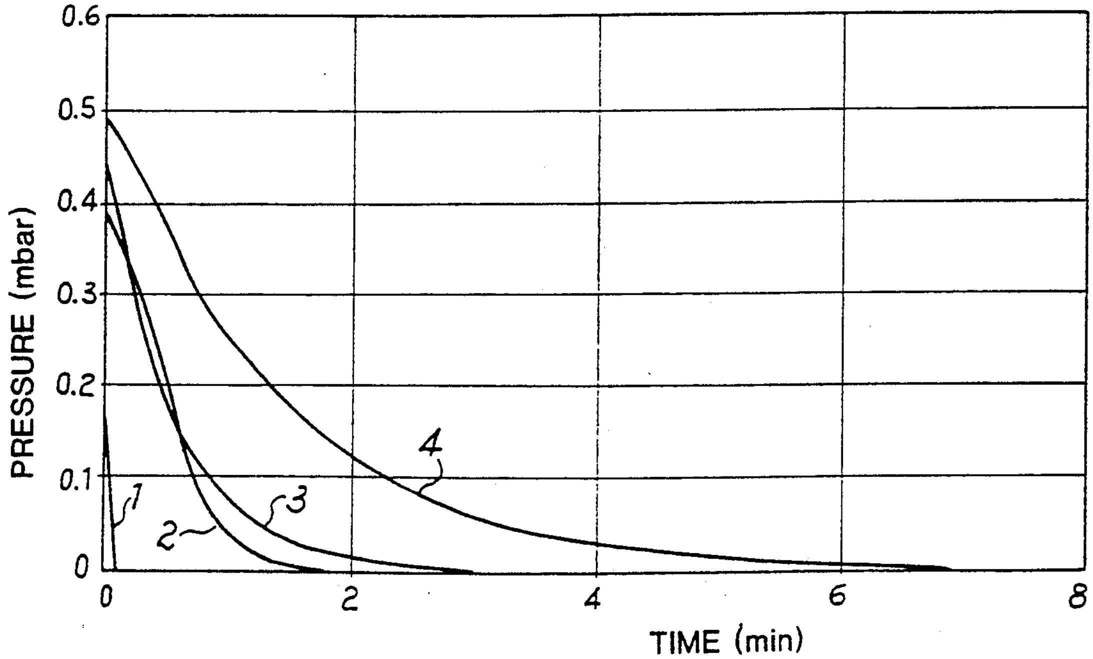
FIGS. 17–18 show the results of sorption tests of $N_2$ at 25° C. performed on an alloy of $BaLi_3Al$ of the present invention.
Figure 18:
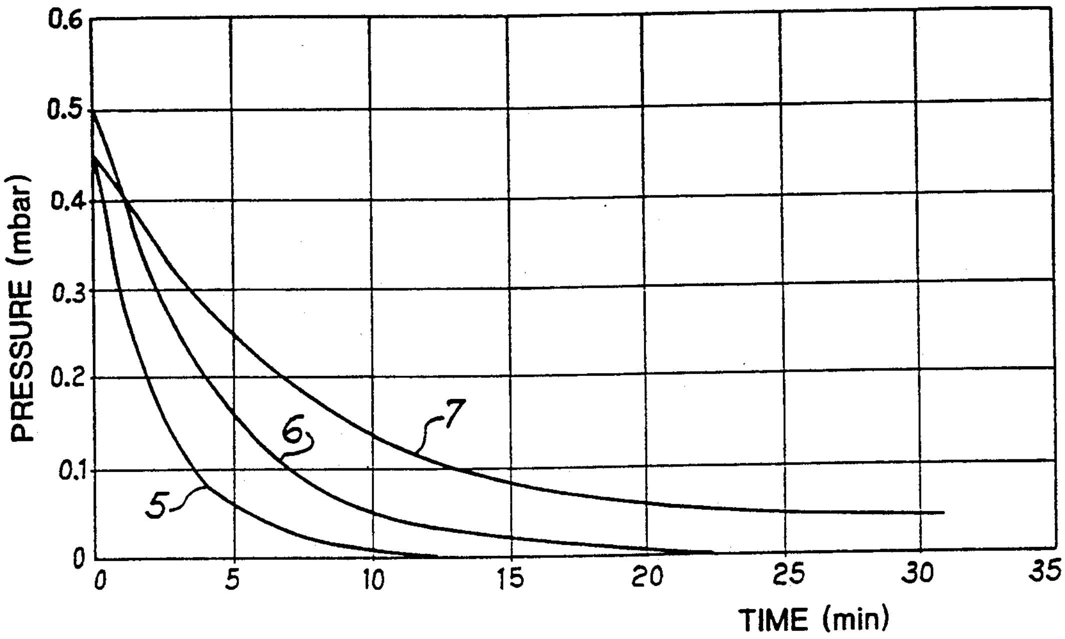
Figure 19:
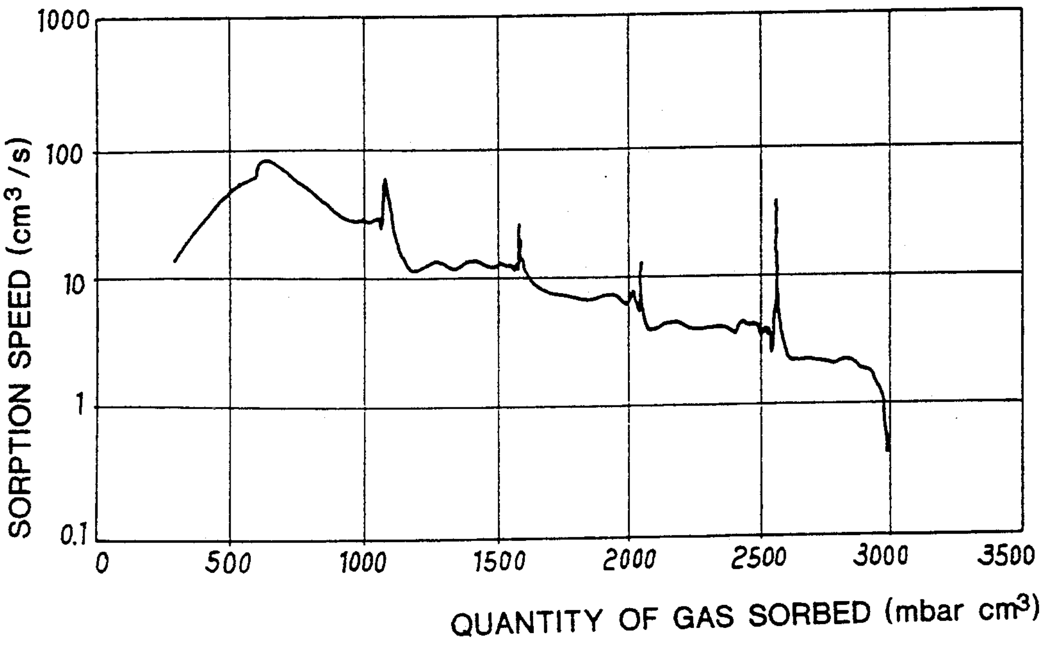
FIG. 19 shows the gas sorption speed derived from the curves of FIGS. 17–18 as a function of the quantity of nitrogen sorbed.

This example was designed to show the use of the alloy produced as in Example 8 in the process of the present invention. A barium-lithium-aluminium alloy as prepared in Example 8 above was placed in a glove box under a protective atmosphere of argon at slightly greater than 1 atmosphere pressure. The alloy was ground to a particle size of less than 1 mm with a pestle and a mortar and a sample of 2.4 g was sealed in a glass vessel of volume 0.32 litre. The sorption properties were measured as in Example 3 for $N_2$ at 25° C. and are reported as curves 1-7 in FIGS. 17-18. FIG. 19 shows the gas sorption speed derived from the curves of FIGS. 17-18, by differentiation, as a function of gas sorbed.

EXAMPLE 10

This example was designed to show the $N_2$ sorption properties of a prior art alloy. A low temperature activatable non-evaporated of 70% Zr−24.6% V−5.4% Fe (nominal weight composition) of weight 100 mg was activated by heating to 450° C. for 10 minutes under vacuum at better than $10^{-3}$ mbar and then caused to sorb $N_2$ at 25° C. at a pressure of about $10^{-5}$ mbar in an apparatus described in the ASTM F798-82 Standard Practice for Determining Gettering Rate, Sorption Capacity, and Gas Content of Nonevaporable Getters in the Molecular Flow Region. The gettering rate (sometimes called sorption speed) was plotted against the quantity sorbed, for the equivalent 2 g getter, to give curve A on FIG. 20.

Figure 20:
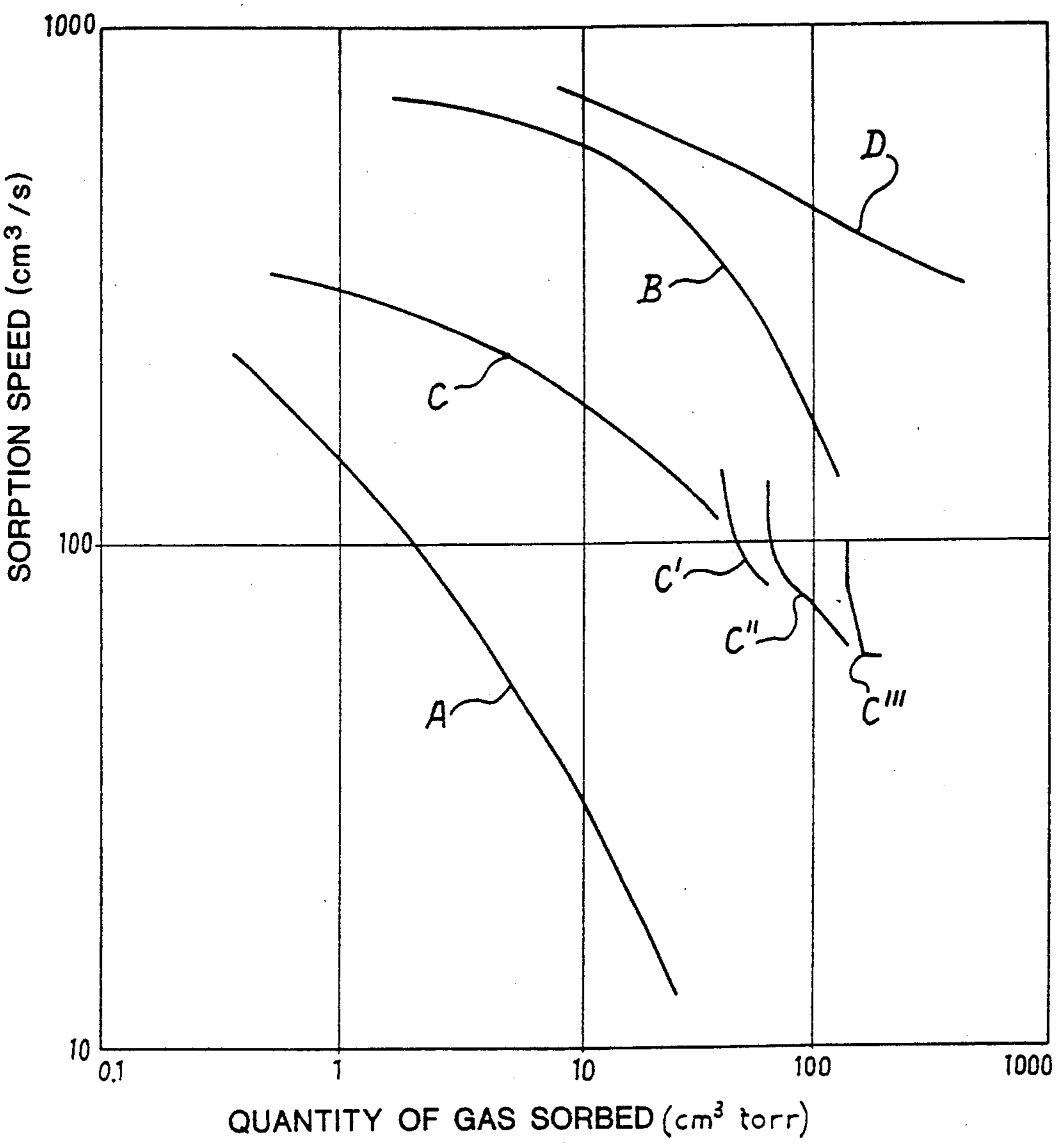
FIG. 20 shows the gas sorption speed of $BaLi_4$ and a traditional non-evaporated getter, for nitrogen, at various temperatures obtained by a different technique to that used for obtaining curves of FIGS. 6, 10, 16 and 19.

The test was repeated using a sorption temperature of 350° C. and the curve of nitrogen sorption, again for the equivalent 2 g getter was plotted as curve B of FIG. 20.

EXAMPLE 11

This example was designed to show the $N_2$ sorption properties of an alloy according to the present invention. A barium-lithium alloy as prepared in Example 2 above was prepared and 2 g, having a particle size of less than 1 mm, was placed in the same ASTM apparatus used for Example 10. After being held at a temperature of 100° C. for 15-20 minutes, which simulates a process to which the getter may be subjected the getter was cooled to 25° C. and its curve of nitrogen sorption was plotted as curve C on FIG. 20. After the getter had sorbed a quantity of gas the flow was interrupted. On continuing, the curve C′ was obtained, and successively with curves C″ and C‴.

EXAMPLE 12

The Example 11 was repeated except that the getter was activated at a temperature of 130° C. for 3 hours followed by 100° C. for 16 hours and the getter was held at 80° C. while sorbing nitrogen. The gettering rate was again plotted against quantity sorbed to give curve D on FIG. 20.

DISCUSSION

By comparison of curve C with curve A of FIG. 20, and D with B, it is seen that alloys used in processes of the present invention have a higher gettering rate (sorption speed) when they have sorbed a greater quantity of nitrogen than traditional getter alloys. Furthermore these properties are obtained after activation at much lower temperatures. In addition FIGS. 6, 10, 16 and 19 show a remarkable ability for the large quantities of $N_2$ and other gases sorbed. Although the invention has been described in considerable detail with reference to certain preferred embodiments designed to teach those skilled in the art how best to practice the invention, it will be realized that other modifications may be employed without departing from the spirit and scope of the appended claims. For instance, it will be realized that small amounts of lithium can be replaced by other elements of the alkali metal series of elements, and notably sodium and potassium without substantially affecting their properties. Furthermore although the invention has been described and exemplified in terms of the stoichiometric compound $BaLi_4$ some degree of departure from stoichiometry will be allowed within the formula $Ba_{1-x}A_xLi_{4-y}B_y$, for example $BaLi_4 \pm 1Li$.

What is claimed is:

1. A process for the sorption of residual gas in a vessel by a non-evaporated barium getter comprising the steps of:
   i) reducing an alloy of $Ba_{1-x}A_xLi_{4-y}B_y$ to particles under a vacuum or inert gas to produce a reduced alloy; and
   ii) placing the reduced alloy in the vessel; and
   iii) providing a partially evacuated atmosphere within the vessel to produce an evacuated vessel; and
   iv) exposing the reduced alloy to the residual gas at a temperature less than 150° C., and absorbing the residual gas without vaporizing the reduced alloy wherein,
   "A" is a metal chosen from the group consisting of elements of Group IIa of the periodic table of elements, excluding barium, and,
   "B" is a metal chosen from the group consisting of Group IIIa, of the periodic table of elements and magnesium, and
   "x" has a value from zero to 0.8; and
   "y" has a value from zero to 3.5.

2. A process of claim 1 in which step iii) includes exposing the reduced alloy to the residual gas at a temperature of between 50° and 150° C. for at least 10 minutes and then reducing the temperature to less than 50° C.

3. A process of claim 1 in which A is a metal chosen from the group consisting of magnesium, calcium and strontium.

4. A process of claim 1 in which B is metal chosen from the group consisting of boron, aluminium and magnesium.

5. A process of claim 1 in which $0 \leqq x \leqq 0.5$.

6. A process of claim 1 in which the non-evaporated barium getter comprises the alloy $Bali_4$.

7. A process of claim 1 in which the non-evaporated barium getter comprises the alloy $Ba_{0.75}Ca_{0.25}Li_4$.

8. A process of claim 1 in which the non-evaporated barium getter comprises the alloy $Ba_{0.5}Ca_{0.5}Li_4$.

9. A process of claim 1 in which the non-evaporated barium getter comprises the alloy $BaLi_3Al$.

10. A process of claim 1 in which the reduced alloy has a particle size of less than 5 mm.

11. A process of claim 10 in which the reduced alloy has particle size of less than 1 mm.

12. A process for the sorption of residual gas in a vessel by a non-evaporated barium getter comprising the steps of:
   i) comminuting an alloy of $Ba_{1-x}A_xLi_{4-y}B_y$ to particles in the absence of reactive gases to produce a particulate alloy; and
   ii) placing the particulate alloy in the vessel; and
   iii) providing a partially evacuated atmosphere within the vessel to produce an evacuated vessel; and
   iv) exposing the particulate alloy to the residual gas at a temperature less than 150° C., and absorbing the residual gas without vaporizing the particulate alloy wherein,
   "A" is a metal selected from the group consisting of magnesium, calcium, and strontium; and
   "B" is a metal selected from the group consisting of boron, aluminum and magnesium; and
   "x" has a value from zero to 0.8; and
   "y" has a value from zero to 3.5.

13. A process for the sorption of residual gas in a vessel by a non-evaporated barium getter comprising the steps of:
   i) comminuting an alloy of $BaLi_4$ to particles in the absence of reactive gas to produce a particulate alloy; and
   ii) placing the particulate alloy in the vessel; and
   iii) providing a partially evacuated atmosphere within the vessel to produce an evacuated vessel; and
   iv) exposing the particulate alloy to the residual gas at a temperature of less than 150° C., and absorbing the residual gas without vaporizing the particulate alloy.

14. A process for the sorption of residual gas at temperatures less than 150° C. in a closed vessel by contacting the residual gas with a particulate alloy of $Ba_{1-x}A_xLi_{4-y}B_y$, wherein:
   the particulate alloy has a particle size less than 5 mm; and sorption of residual gas without vaporizing the particulate alloy; and
   "A" is a metal selected from the group consisting of magnesium, calcium, and strontium; and
   "B" is a metal selected from the group consisting of boron, aluminum, and magnesium; and
   "x" has a value from zero to 0.8; and
   "y" has a value from zero to 3.5.

* * * * *